United States Patent [19]
Morishita et al.
[11] Patent Number: 4,607,336
[45] Date of Patent: Aug. 19, 1986

[54] CHANGE CONTROL MICROCOMPUTER DEVICE FOR VEHICLE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 496,035

[22] Filed: May 19, 1983

[30] Foreign Application Priority Data

May 19, 1982 [JP] Japan .................................. 57-86065
May 19, 1982 [JP] Japan .................................. 57-86066

[51] Int. Cl.⁴ .......................... H02J 7/14; G06F 15/56
[52] U.S. Cl. .................................... 364/424; 364/483; 320/61; 320/62; 322/22; 322/23; 324/433
[58] Field of Search .............. 364/424, 431.01, 431.03, 364/431.04, 481, 483; 322/22, 24; 320/32-34, 36-43, 48, 49, 61, 64, 62, 72; 324/433

[56] References Cited

U.S. PATENT DOCUMENTS 3,477,013 11/1969 Smith .................................... 322/32
3,991,357 11/1976 Kaminski .............................. 320/22
4,153,867 5/1979 Jungfer ................................. 320/43
4,290,109 9/1981 Taniguchi et al. .................... 320/32
4,308,492 12/1981 Mori et al. ............................ 320/43
4,418,310 11/1983 Bollinger ............................... 320/39
4,423,378 12/1983 Marino et al. ........................ 320/48

*Primary Examiner*—Felix D. Gruber
*Assistant Examiner*—Thomas G. Black
*Attorney, Agent, or Firm*—Sughrue, Mion, Zinn, Macpeak & Seas

[57] ABSTRACT

A charging control system includes a clutch interposed between the generator and the engine, and a microcomputer for receiving input data and determining a suitable reference voltage for the system voltage regulator, and a suitable engagement state of the clutch, in order to drive the generator in an optimum r.p.m. range at all times. The microcomputer may also be used for detecting faults in the charging system, and displaying the detected results on a display unit.

6 Claims, 2 Drawing Figures

DISPLAY
8
801
707
CHARGE CONTROL M/C
7
701
702
703
704
705
706
5
6
VOLTAGE REGULATOR
4
401
402
403
404
405
GEN
3
301
302
303
304
305
CLUTCH DEVICE
2
201
ENGINE
1
SENSOR
10
101
ACTUATOR
11
111
ENGINE CONTROL M/C
9
901
902
903

ENGINE
SENSOR
ACTUATOR
ENGINE CONTROL M/C
CLUTCH DEVICE
GEN
VOLTAGE REGULATOR
CHARGE CONTROL M/C
1
2
3
4
5
6
7
9
10
11
77
101
111
201
301
302
303
305
401
402
403
404
405
701
702
703
705
706
901
902
903

CHANGE CONTROL MICROCOMPUTER DEVICE FOR VEHICLE

BACKGROUND OF THE INVENTION

This invention relates to a charge control microcomputer device for a vehicle, in which, in order to drive the charging generator of a vehicle or the like within an optimum, predetermined range of r.p.m., a clutch device is arranged between the generator and the engine driving the generator, the predetemined value of a voltage regulator for controlling the output voltage of the generator is externally set, system failures are detected according to data received from various points in the charge system, and the results of such fault detection are displayed.

In general, in a conventional device of this type, the output of a charging generator driven by an internal combustion engine of a vehicle or the like is controlled to a predetermined value by a voltage regulator installed together with the generator, so as to charge the battery on the vehicle. However, the conventional device suffers from a drawback in that, in the case where the predetermined value is controlled during acceleration or deceleration of the engine to thereby control the output of the generator, which is a mechanical load of the engine, it is difficult to externally control the output.

Furthermore, the conventional device is disadvantageous in that the occurrence of faults in the charge system, such as, for instance, when the charging generator generates no power or is not controlled at all, and when the first rectifier output terminal is disconnected, cannot be detected or displayed.

A conventional charging generator generally employs a driving system such that the generator is driven, with a certain speed change ratio, through a belt or the like by the internal combustion engine of the vehicle. However, such a system is disadvantageous in that the output current and efficiency of the charging generator vary with the speed of the engine, so that the output current may be insufficient in the low speed operating range of the engine, and saturated at high speed operation, thus increasing the power loss and inefficiency of the system.

SUMMARY OF THE INVENTION

Accordingly, an object of this invention is to provide a charge control microcomputer for a vehicle in which the above-described difficulties have been eliminated.

DETAILED DESCRIPTION OF THE PREFERRED EMBODIMENTS

Figure 1:
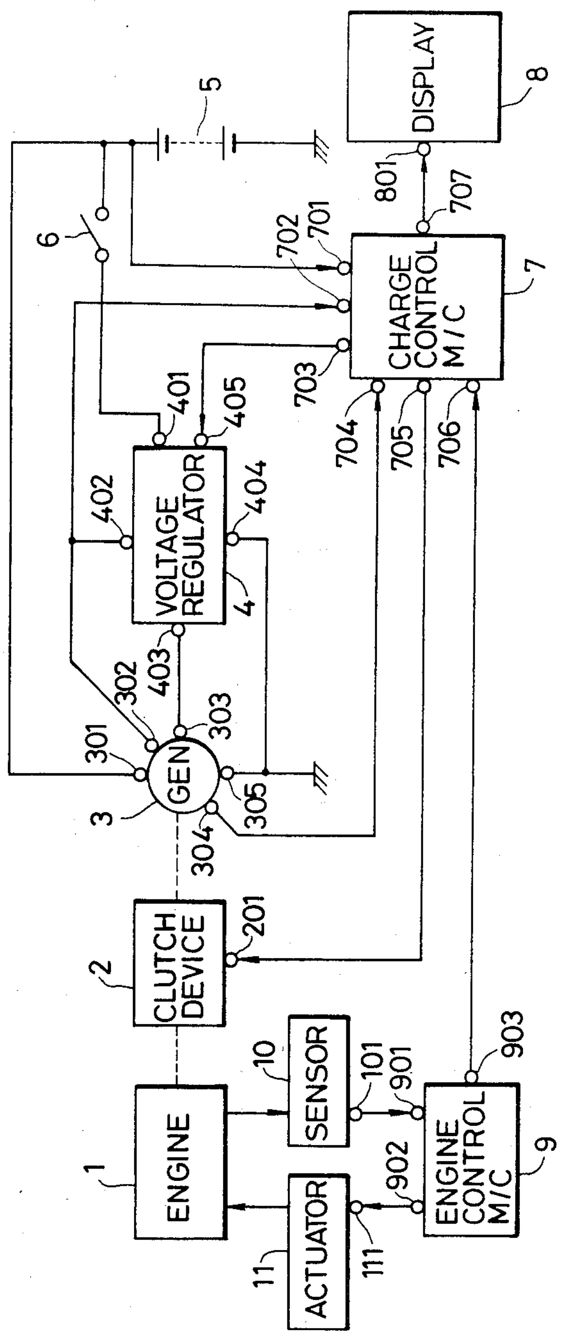
FIG. 1 of the accompanying drawings is a block diagram showing one example of a charge control microcomputer device for a vehicle according to this invention.

The charge control microcomputer system according to the invention will now be described with reference to the accompanying drawings. In FIG. 1 of the accompanying drawings reference numeral 1 designates an internal combustion engine; 2, a clutch device for transmitting the rotary output of the engine 1; 201, an input terminal for receiving an operating instruction (as to engagement, disengagement or slip) from a charge control microcomputer 7 (described later); 3, a charging generator driven through the clutch device 2; 301, a first rectifier output terminal; 302, a second rectifier output terminal for providing generated voltage data; 303, a field coil output terminal; 304, a neutral point voltage output terminal for providing generated voltage data from the neutral point of star-connected armature coils (not shown); 305, a ground terminal; 4, a voltage regulator for controlling the output voltage of the charging generator 3 to a predetermined value, the regulator 4 having an initial excitation terminal 401, a voltage detection terminal 402, a field coil input terminal 403, a ground terminal 404, and an external control terminal 405.

Further in FIG. 1, reference numeral 5 designates a battery which provides battery terminal voltage data; 6, a key switch; 7, the control microcomputer; 701, a battery terminal voltage input terminal; 702, a second rectifier output terminal voltage input terminal; 703 a reference signal output terminal through which an external control reference signal is applied to the external control terminal 405 of the voltage regulator; 704, a neutral point voltage input terminal; 705, an output terminal through which the operating instruction is applied to the clutch device 2; 706, an input terminal for receiving data from an engine controlling microcomputer 9 (described later); 707, a display content output terminal; 8, a display unit; and 801, a display content input terminal.

Further in the figure, reference numeral 9 designates the aforementioned engine controlling microcomputer which receives various data (regarding intake gas temperature, r.p.m., crank angle, exhaust gas temperature, the air fuel ratio, etc.) from the engine 1, to control the latter; 901, an input terminal for receiving a signal from an engine sensor 10; 902, an engine control signal output terminal; 903, an output terminal through which data is applied to the charge control microcomputer 7; 10, the aforementioned sensor for detecting engine data and applying the detection signal to the engine controlling microcomputer 9; 101, a sensor signal output terminal; 11, an actuator for receiving a control signal from the microcomputer 9, to mechanically drive a part of the engine 1; and 111, a control signal input terminal.

The operation of the device of the invention as thus constructed will now be described.

First, when the key switch 6 is closed to start the engine 1, a loop circuit made up of the battery 5, the key switch 6, the initial excitation terminal 401 and the voltage detection terminal 402 of the voltage regulator 4, the second rectifier output terminal 302 of the charging generator 3, the field coil of the charging generator 3, which is connected to the field coil output terminal 303, the field coil input terminal 403 of the voltage regulator 4 and the ground terminal 404 is completed. As a result, an initial exciting current flows in the field coil and a field magnetomotive force is generated therein. At the same time, the terminal voltage of the battery 5 is applied through the key switch 6 to the computers 7 and 9, and, when necessary, to the clutch device 2, the sensor 10 and the actuator 11, to operate these elements.

When, under this condition, the engine 1 is started, the charge control microcomputer 7 processes a rotation signal, which is one of the engine parameters received from the engine controlling microcomputer 9, to generate and apply an operating instruction (as to engagement, disengagement, or slip) through the operating instruction output terminal 705 to the clutch device 2, so that the charging generator 3 is driven within an optimum, predetermined range of r.p.m. at all times.

During operation of the engine 1, the charging control microcomputer 7 processes the engine data from the engine controlling microcomputer 9 and charge system data including battery terminal voltage data and generated voltage data, to apply a reference voltage which is most suitable for the engine and the charge system, through the reference signal output terminal 703 to the voltage regulator 4. When no power is generated by the charging generator, or when the generator is not controlled at all, or the first rectifier output terminal 301 is disconnected, the charge control microcomputer 7 detects the occurrence of such failures according to data from various points in the charge system, and applies the detection signal to the display unit 8, so that the fault thus detected is displayed on the display unit.

Figure 2:
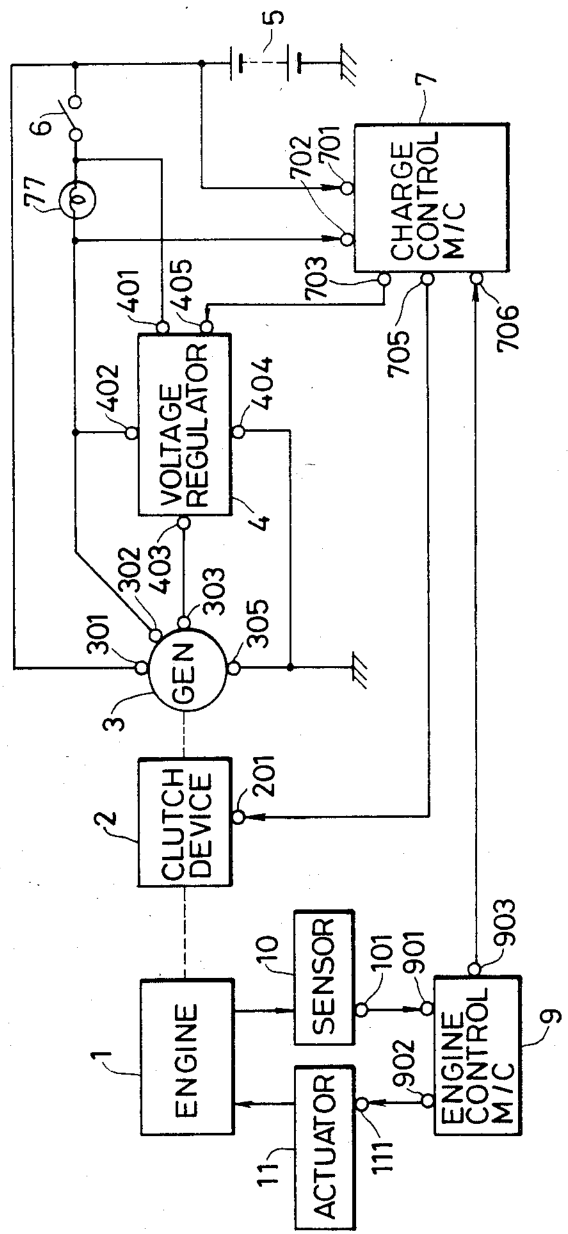
FIG. 2 is a block diagram showing one modification thereof.

FIG. 2 shows a second embodiment of the charge control system of the invention, wherein the reference numerals common to FIG. 1 represent the same or similar components. The device of FIG. 2 does not perform a fault detection function, and thus is not provided with a display unit for this purpose as was the case with the device of FIG. 1. In the device of FIG. 2, generated voltage data is taken from the second rectifier output terminal 302, thus making unnecessary the connection 304 to the armature coil neutral point as used in FIG. 1. The system of FIG. 2 otherwise performs similarly to the FIG. 1 system, and thus a detailed description thereof is not believed necessary.

The device of FIG. 2 includes a charge display lamp 77 connected between the second rectifier output terminal 302 and the switch 6 for indicating a non-charging state. When the switch 6 is closed to start the engine, as described above, the lamp 77 is included in the closed circuit made up of the battery 5, the key switch 6, the display lamp 77, the initial excitation terminal 401 of the voltage regulator 4, the voltage detection terminal 402, the second rectifier output terminal 302 of the generator 3, the field coil in the generator 3, which is connected to the field coil output terminal 303, the field coil input terminal 403 of the voltage regulator 4 and the ground terminal 404. As a result, an initial exciting current flows in the field coil, and a field magnetomotive force is generated therein with the charge display lamp turned on.

When, under this condition, the engine 1 is started, the charging generator begins to generate electricity. When the charging generator is generating electricity in a normal fashion, the potential difference between the two terminals of the charge display lamp 77 is substantially zero and therefore the lamp 77 is turned off, thus indicating the fact that the generator 3 is generating electricity.

As was described in detail above, in the device of the invention, a clutch device is interposed between the engine and the charging generator, and is controlled by the charge control microcomputer which processes engine data and charge system data including the battery terminal voltage data and the generated voltage data, so that the charging generator is driven within the optimum, predetermined range of r.p.m. at all times. Accordingly, problems caused by the variation in speed of the charging generator, such as the insufficient output during the low speed operation of the engine, or the increase of loss during the high speed operation, are eliminated according to the invention. Thus, the charging generator can be operated under the optimum use conditions.

Furthermore, in the invention, the charge control microcomputer processes engine data and charge system data to determine the reference voltage for the voltage regulator. Therefore, the invention has merit in that the reference voltage thus determined is the most suitable for the charging of the battery, and the mechanical load can be readily controlled during acceleration or deceleration of the engine.

In the device according to one embodiment of the invention, the occurrence of system faults is detected according to data from various points in the charge system and the results of detection are displayed. Accordingly, system failures can be detected by the device of the invention, unlike the conventional device. In addition, the detected faults can be displayed on a display unit separately according to the contents thereof, which contributes to a reduction in the repair time.

In the above-described examples, the generated voltage data is obtained from the neutral point 304 of the armature coils of the charging generator or from the second rectifier output terminal 302. However, it may be obtained from a one-phase output terminal of the armature coils with the same effect.

What is claimed is:

1. A charge control microcomputer device for a vehicle, comprising:
   - a clutch device for transmitting the rotary output of an engine;
   - a charging generator driven by said clutch device;
   - a battery charged by an output of said charging generator;
   - a voltage regulator for controlling an output voltage of said charging generator to a predetermined value;
   - an engine controlling microcomputer for receiving engine data, to control said engine; and
   - a charge control microcomputer for processing said engine data from said engine controlling microcomputer and charge system data including terminal voltage data from said battery and generated voltage data from said charging generator, to determine a reference voltage for said voltage regulator in accordance with said engine data and said charge system data, and for processing an engine rotation signal to generate and apply an operating instruction to said clutch device in accordance with said engine data and said charge system data, such that said charging generator is driven within a predetermined range of revolutions per minute at all times.

2. An apparatus as claimed in claim 1, wherein said charge control microcomputer additionally detects faults in the charging system on the basis of charge system data received thereby from several points of said charging system.

3. An apparatus as claimed in claim 2, further including a display unit for displaying fault detection data generated by said charge control microcomputer.

4. An apparatus as claimed in claim 1, said clutch device comprising a slip-type clutch, and said operating instruction comprising a command to said clutch indicative of a desired clutch engagement state.

5. An apparatus as claimed in claim 1, wherein said engine rotation signal is produced in accordance with at least one engine operating parameter which constitutes part of said engine data received from said engine controlling microcomputer.

6. An apparatus as claimed in claim 1, further including a charging indicator arranged between said charging generator and said battery, for indicating the charging condition of said generator.

* * * * *